Dec. 27, 1966   S. FEIN   3,294,924
APPARATUS FOR CARRYING OUT INDUSTRIAL OPERATION
Filed May 29, 1958   3 Sheets-Sheet 1

WITNESSES

INVENTOR
Samuel Fein
BY
ATTORNEY

United States Patent Office 3,294,924
Patented Dec. 27, 1966

3,294,924
APPARATUS FOR CARRYING OUT
INDUSTRIAL OPERATION
Samuel Fein, North Huntingdon Township, Westmoreland County, Pa., assignor to Westinghouse Electric Corporation, East Pittsburgh, Pa., a corporation of Pennsylvania
Filed May 29, 1958, Ser. No. 738,777
12 Claims. (Cl. 179—100.1)

This invention relates to methods and apparatus for carrying out an industrial operation and has particular relationship to the effective coordination of the component steps of such an operation. In its specific aspects, this invention is applicable to the carrying out of many of the welding, drilling or assembling operations which are carried out in modern industry. Typically, the invention may be applied to the operation of a Wiedemann Press, to the marking of a sheet preparatory to a drilling or welding operation, to the welding operation itself, and to the assembly of a cable harness, for example, the harness used in the control and the supply of a traction motor or of a power generator. For purposes of illustration the invention will be herein described as applied to the assembly of a cable-harness of the type just discussed, but it is to be understood that other operations carried out in industry are within the scope of this invention.

The assembly of a harness may be carried out by a single operator or by a plurality of operators, each assembling a part of the harness. The harness is usually assembled on a board which is provided with pegs at different points which serve to guide the various conductors of the harness and as anchor points for the conductors. The operator is provided with a bin from which he may derive conductors of the required lengths in the proper sequence to carry out the assembly operation.

In accordance with the teachings of the prior art printed or typewritten instructions are provided to instruct the operator. These instructions are prepared by a so-called information writer from the schematics and cicuit diagrams of the assembly, and they are tabulated and usually also numbered. The operator repeatedly refers to the instruction carrying out each instruction in its turn.

The basic disadvantage of the prior art procedure is that it is uneconomical. The printed instructions must be derived from the diagrams showing the apparatus to be produced. It has been found that the time taken by the information writer in converting the data on the drawings into the printed instructions is excessive. In addition, in carrying out the operation, the operator must repeatedly return to the printed instructions to read each new instruction or to reread a preceding instruction as to which he is not certain. It has been found that the cost of the operator's time is high. In addition, numerous errors are made in carrying out the instructions. The errors arise in part from the misreading of letters, for example, the reading of a letter E as F or a letter F as E and in the selection of an instruction in improper order.

It is, accordingly, broadly an object of this invention to provide a method and apparatus for carrying out economically an industrial operation of the type that may be subdivided into a plurality of coordinated steps which are performed in succession to complete the operation.

In accordance with this invention in its broader aspects the operator is instructed audibly. The component steps of the operation are recorded in succession on a record, for example, a magnetic tape, by the information writer. When the industrial operation is being carried out, the record is played back to the operator instructing him as to each step of the succession.

It is, then, a specific object of this invention to provide a record particularly suitable for the audible instruction of an operator carrying out the coordinated steps of an industrial operation.

It is another specific object of this invention to provide apparatus for recording the coordinated steps of an industrial operation on a record so that the record may serve subsequently to instruct the operator carrying out the operation audibly.

It is a further specific object of this invention to provide a reproducer for reproducing a record having recorded thereon successive coordinated steps describing the carrying out of an industrial operation.

The record in accordance with this invention has recorded thereon a succession of messages or instructions, each describing one of the coordinated steps of the operation. Between each message and the just preceding and the just-succeeding messages, signaling means are provided. This signaling means serves to enable the operator to select the message which he desires to hear.

The recording apparatus, in accordance with this invention, includes means for recording the messages and the signals between each message, and the messages just preceding and succeeding it. In accordance with the specific aspects of this invention, the recording apparatus includes a transport by means of which the recording medium or record, for example a magnetic tape, is advanced. While it is advanced, the record is subjected to conversion means, such as a recording head which produces the appropriate impressions on the record. In addition, the apparatus includes a second converting means for impressing the signals between the messages on the record. The apparatus includes suitable switching means so that the information writer may set the recording apparatus for recording a message and for recording the signals between messages. An information writer may thus record a succession of messages describing a coordinated succession of steps while viewing drawings showing apparatus to be made or an operation to be carried out. The recording apparatus, in accordance with this invention, also preferably includes a counter for assigning to each of the messages an ordinal number.

The reproducer, in accordance with this invention, includes a transport for the record. The transport is controlled from a plurality of switch means readily available to the operator who is carrying out the industrial operation. Actuation of one of the switch means causes the record to advance in a forward direction, and actuation of the other causes the record to advance reversely. The apparatus also includes a conversion unit responsive to the recording on the record for converting this recording into sound. In addition, there is a second converting unit for converting the signals between the messages into electrical signals with which controlling operations are carried out. The latter serve to stop the record after one of the messages have been advanced past the message converting unit. It also serves to actuate a counter and in addition it serves to actuate any mechanisms for setting the apparatus with which the industrial operation is being carried out for each of the successive messages.

The novel features considered characteristic of this invention are disclosed generally above. The invention itself, both as to its organization and as to its method of operation, together with additional objects and advantages thereof, will be understood from the following description of specific embodiments when read in connection with the accompanying drawings, in which.

Description

Figure 1:
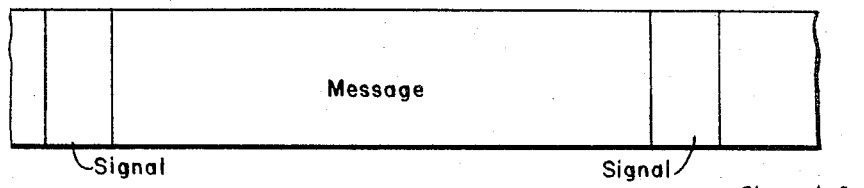
FIGS. 1, 2, 3 and 8 are diagrammatic views of records in accordance with this invention.
Figure 2:
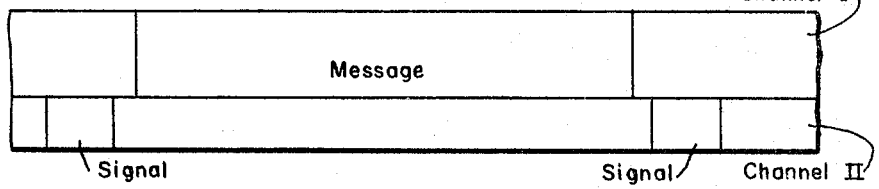
Figure 3:
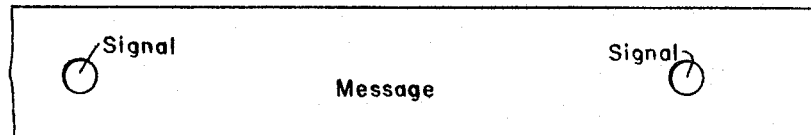

In FIGS. 1, 2 and 3 records of different types in accordance with this invention are shown. These records have in common the characteristic that they have impressed thereon a succession of messages separated by signals or signal impressions for controlling the reproducing apparatus and the operation being carried out.

The messages on this record shown in FIG. 1 is of the single channel type and may be impressed with a single converter connected to the message source and the signal source; that is, the source for impressing the signals, through selectable filters. A record of this type may carry superimposed on the impressions corresponding to the messages, a constant tone of a frequency well below or well above the frequency range of the messages. For example, where the frequency range for the messages is between 200 and 3000 cycles per second, the tone may have a frequency of 100 cycles or a frequency of 5000 cycles. In regions which separate the messages where the signal is produced, both the tone and the message are suppressed. Thus the signal is in effect a blank space in the tone.

A record of this type is reproduced with apparatus including a low or high pass filter for the tone and an intermediate-frequency-band filter for the message. The low or high pass filter is connected so that the tone impressions maintain the advance of the record so long as they are present and interrupt the advance of the record when they are absent. The band filter prevents the tone from being reproduced.

FIG. 2 shows a record on which the messages and the signals between messages are produced in two different recording channels Channel I and Channel II. The messages are impressed in one transverse region of the record and the signals in an adjacent region. In a record of this type the signals may be produced by a tone generator which transmits a tone during the intervals between messages. The messages and the signals are impressed and reproduced by separate recording heads disposed transversely along the record to impress and take off the messages and the signals in the proper transverse positions along the record. In this case, the reproduction of the signal during the intervals between messages causes the record to stop and the other operations to be performed.

In the record shown in FIG. 3 the signal impressions are holes punched in the record between the messages. For this purpose, a solenoid actuable punch may be provided in the path of the record. Following each message, this punch is actuated to produce the hole signal. In the system for reproducing the record shown in FIG. 3, a brush may be provided which engages a conductor on the opposite side of the record when the hole passes through the gate where the messages are reproduced.

In apparatus in accordance with the broader aspects of this invention, facilities for automatically selecting a message to be reproduced may be provided. In such a case, means may be provided for punching holes selectively following each message at different transverse positions along the record. For example, six hole positions may be provided and one to six holes may be punched at different positions of the record. The array of holes in each case would, then, provide a binary (or digital) code which would serve to operate apparatus for setting the record in accordance with a code selected by the operator. In the situation in which there are six holes positioned transversely of the record following each message, a 64 item binary code would be available for control.

Where such a record is used the operator would be provided with a key board on which he could punch a key corresponding to a message desired. The transport would then be actuated to set the record for reproduction of the selected message.

Similar control may be effected with the signals of the type provided on the records shown in FIGS. 1 and 2. In this case different frequencies would serve for the selection of the desired messages or a single frequency would be pulse modulated.

Figure 8:
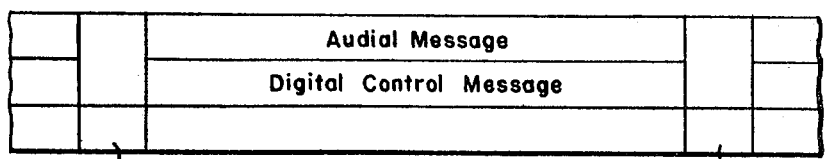

FIG. 8 shows a record which carries digital control information as well as audible information. This record has three channels. In one the audible message is recorded and in a second channel digital control signals which could serve to set apparatus, for example, the rotating head of a Weidemann Press, is recorded. The stop signal is recorded in the third channel.

Figure 4:
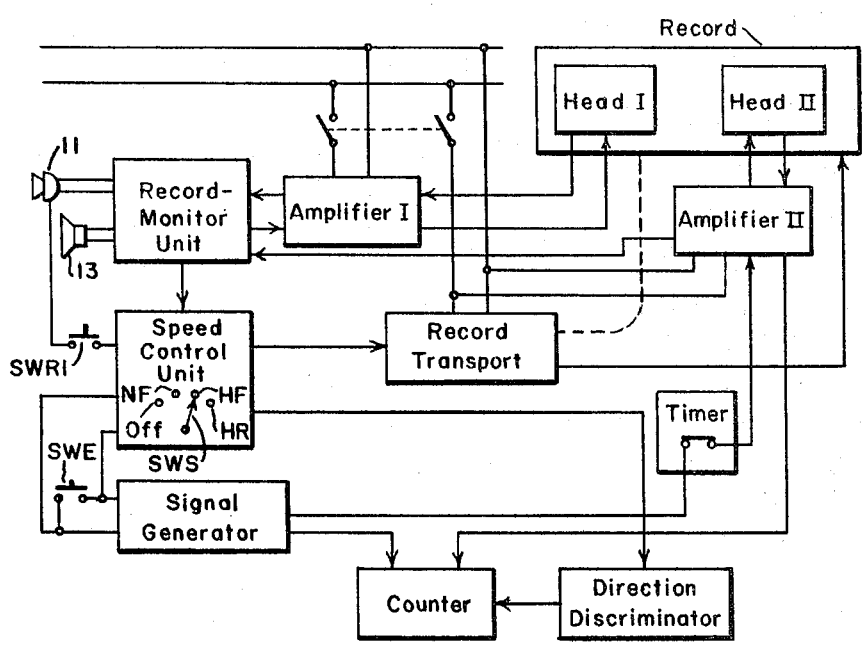
FIG. 4 is a block diagram showing apparatus for recording a record in accordance with this invention.

The apparatus shown in FIGS. 4 through 7 is adapted for recording and reproducing a record of the multichannel type shown in FIG. 2. Apparatus for recording such a record is shown in FIG. 4. Such apparatus includes a Record Transport. The Record is advanced by this Transport through a gate (not shown) where it is subjected to a pair of recording heads, Head I and Head II, one for Channel I and Channel II, respectively. The Heads may be disposed so that the recording takes place at the same regions longitudinally of the Record or at different regions transversely of the Record.

The Record Transport is controlled from a Speed Control Unit which may be set by a selector switch SWS in different positions corresponding to the direction of advance of the record and the speed of the record desired. Usually, there is an off position and three operating positions, forward at normal speed NF, forward at high speed HF, and reverse at high speed HR. The Speed Control Unit is connected to the Transport and sets the drive on the Transport in accordance with the setting of the Speed Control Unit.

The apparatus also includes a microphone 11, a Record-Monitor Unit and a pair of amplifiers, Amplifier I and Amplifier II. In addition, there is a loudspeaker or earphones 13. The microphone 11 is usually provided with a pushbutton switch SWR1 which is closed when a message is being recorded. The switch SWR1 is so connected to the Speed Control Unit that so long as the switch SWR1 is maintained closed, the Record Transport is maintained enabled through the Speed Control Unit and the Record is advanced. The microphone 11 and the loudspeaker 13 are connected to Head I through Amplifier I and the Record-Monitor Unit. The latter Unit may be set for recording or monitoring by a selector switch (not shown). When the Unit is set to record, the voice signal impressed on the microphone 11 is transmitted through the Head I to produce an impression on the record. When the Record-Monitor Unit is set for monitor the message on the record is played back.

The apparatus shown in FIG. 4 also includes a Signal Generator. This Generator may be enabled by closing a pushbutton SWE which is available to the information writer. The Generator is connected to Head II for Channel II through a Timer and through Amplifier II, and when enabled by the closing of button SWE, the tone of the Signal Generator which is usually an audio tone is impressed through Head II on the Record for a predetermined interval, say 1/10 of a second to 3 seconds timed by the Timer. The Timer may be incorporated in the Signal Generator. For example, the Signal Generator may be enabled by a time-delay relay actuated by SWE which drops out after timing the interval independently of the setting of SWE (non-beat, non-repeat). In addition, on the closing of SWE the Speed Control Unit operates to cause the Record Transport to advance the Record. Amplifier II is also connected to the Record-Monitor Unit so that when the latter is set for Monitor the stop signal on the Record is played back.

The apparatus shown in FIG. 4 further includes a

Counter and a Direction Discriminator. The Direction Discriminator is controlled from the Speed Control Unit and in turn conditions the Counter to count forward or in reverse depending on the setting of the Speed Control Unit. The Counter is enabled to count in a forward direction by the Signal Generator and in a reverse direction or at high speed in a forward direction (HF setting of Speed Control Unit) by signals received from Head II through Amplifier II.

Figure 5:
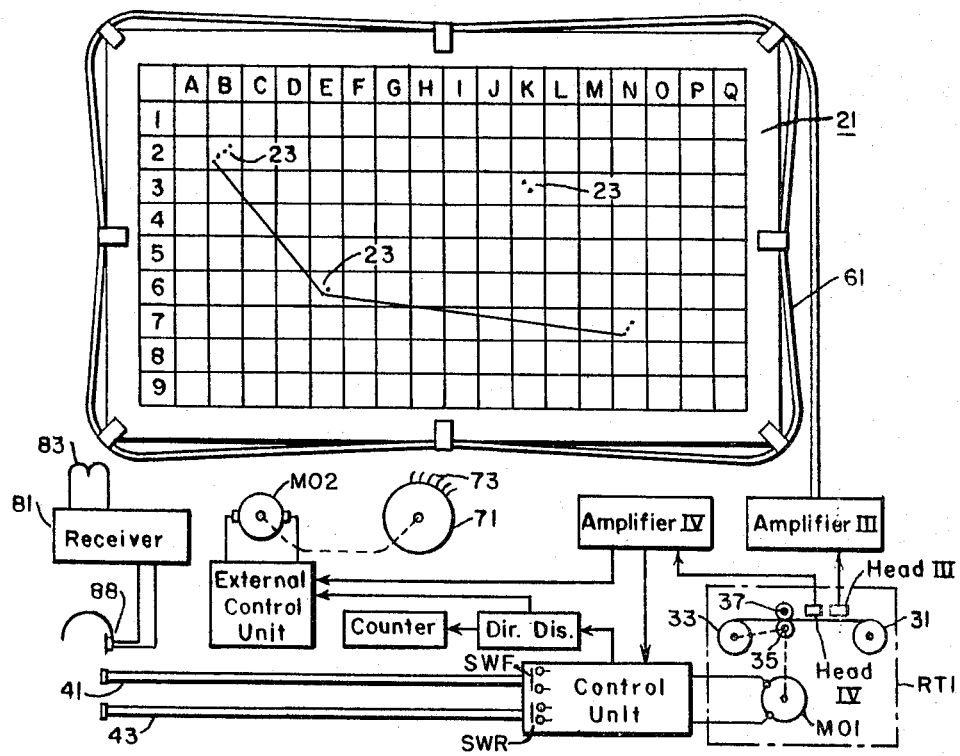
FIG. 5 is a view partly diagrammatic of apparatus in accordance with this invention for practicing this invention in the carrying out of an industrial operation.
Figure 6:
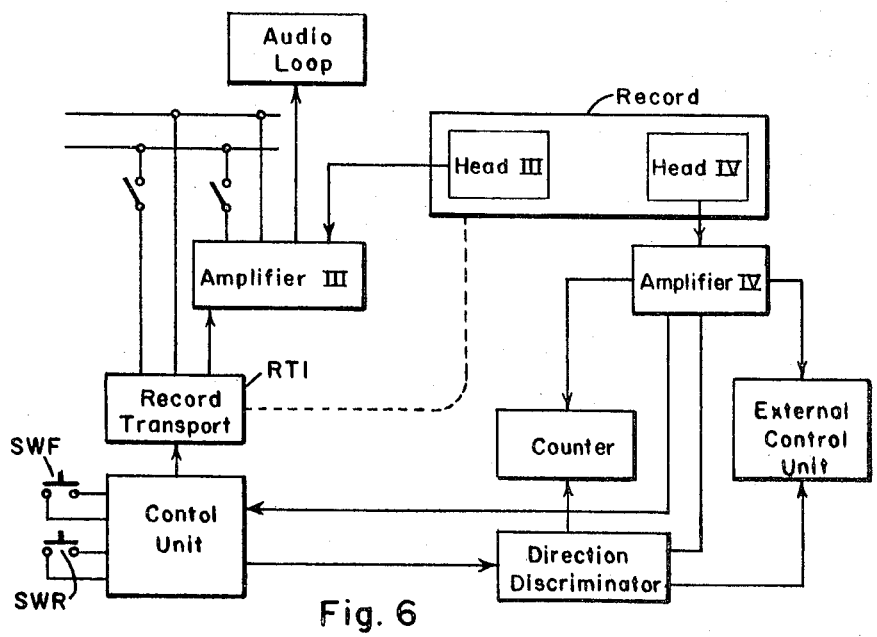
FIG. 6 is a block diagram of reproducing apparatus in accordance with this invention.
Figure 7:
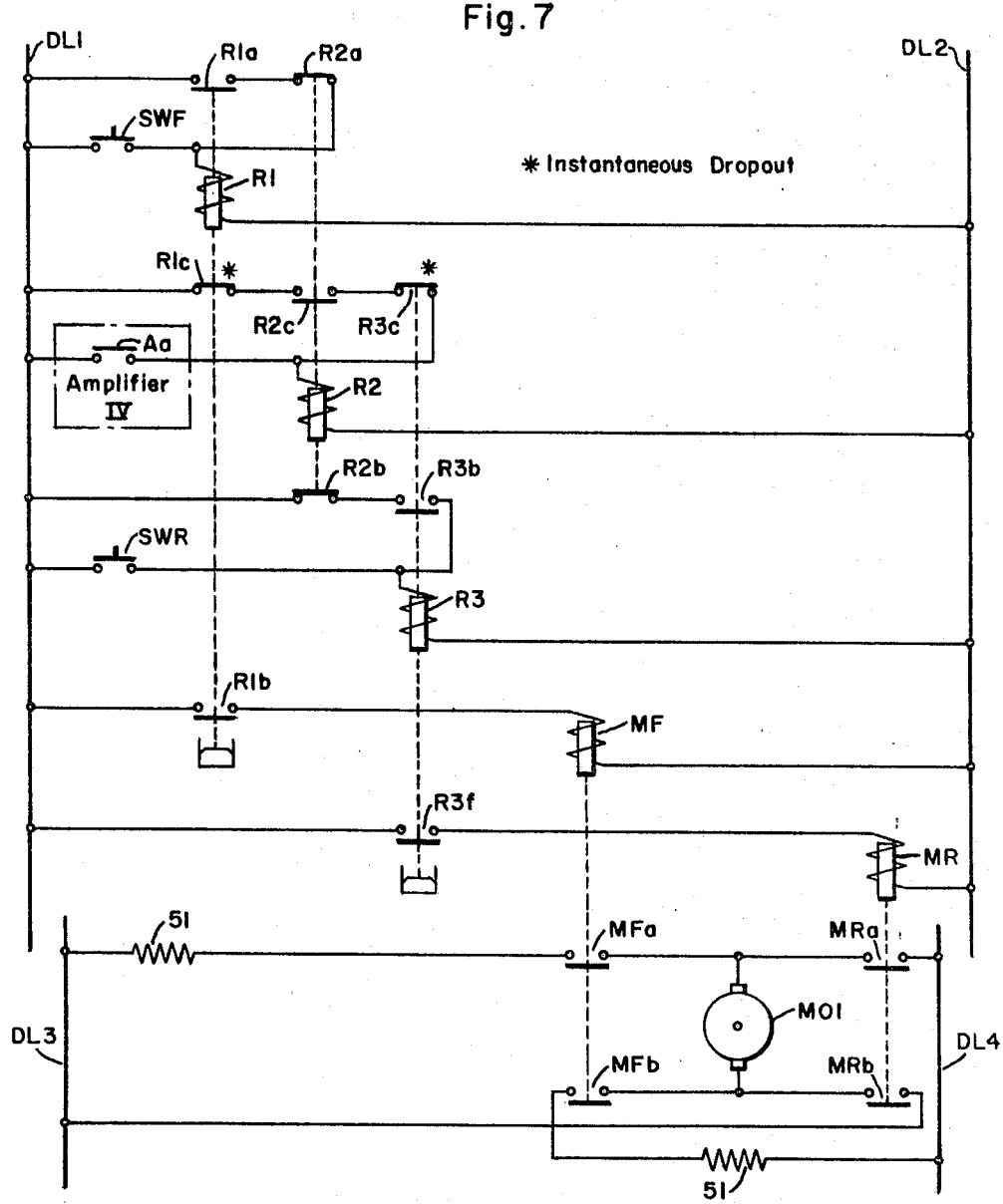
FIG. 7 is a circuit diagram showing an important feature of this invention.

In FIGS. 5 through 7 this invention is shown as applied to the assembly of a cable harness, such as would be used in the control circuit of a traction motor. The harness is assembled on a board 21, which in the case of a harness for a large motor, may be of very large area, for example, a typical board may be 3 feet in height and 20 feet in length. Preferably, the board should be laid out in squares providing a coordinate system. Each block can be identified by one of a set of horizontal letters A through Q and by a set of vertical numbers 1 through 9. The board also includes a number of pegs 23 in certain of the squares which serve as anchors for the various wires or cables and to fix the contour of the wires. Where a square includes a number of pegs, as for example, the square 2–B, a convention may be adopted under which the pegs may be assigned numbers, for example, from left to right, from bottom to top or from top to bottom. In the situation illustrated in FIG. 5, the four pegs 23 in square 2–B may be regarded as having the numbers 1, 2, 3, 4 from bottom to top. Similarly, the three pegs 23 in square 7–N may be regarded as having the numbers 1, 2, 3 from bottom to top. The board 21 thus provides a ready code for the information to be given in assembling the harness. This code may consist of a number identifying the vertical position of the square, a letter identifying the horizontal position of the square and a number identifying the peg. Thus the statement— 2–B3 to 7–N2—would mean that a wire is to be used to connect the third peg from the bottom in square 2–B with the second peg from the bottom in square 7–N.

The apparatus shown in FIGS. 5 through 7 also includes a Record Transport RT1. This Transport includes reels 31 and 33 which serve both as feed and take-up reels depending on the direction of advance of the Record. During reproduction the reel 31 serves as feed reel and 33 serves as take-up reel. The Record is driven by pressure rollers 35 and 37 (or a sprocket wheel) and during reproduction is advanced from the feed reel 31 to the take-up reel 33 in the forward direction. The Record is advanced past converting devices, Head III and Head IV, which convert the impressions on the record into electrical pulses. The rollers 35 and 37 are driven by a motor MO1.

The apparatus shown in FIGS. 5 through 7 further includes a Control Unit for controlling the Record Transport RT1, Amplifier III and Amplifier IV. The Control Unit is selectively controlled from a pair of switches SWF and SWR which may be microswitches. The switches are normally open, but each is adapted to be closed by a fluid in a tube 41 and 43 (FIG. 5) readily accessible to the operator. When the operator steps on either of the tubes 41 or 43 the associated switch SWF or SWR respectively, is closed.

The switches SWF and SWR are connected in circuit as shown in FIG. 7 with the motor MO1 to control this motor. This circuit includes a pair of supply conductors DL1 and DL2 for supplying direct current for control purposes and additional supply conductors DL3 and DL4 for supplying direct current to the motor MO1. The circuit also includes time-delay relays R1 and R3, an auxiliary relay R2 and relays MF and MR for determining the direction of rotation of the motor MO1. The relay R1 has a pair of front contacts R1a and R1b and a back contact R1c. The relay R3 has a pair of front contacts R3a and R3b and a back contact R3c. Contacts R1c and R3c should preferably be instantaneous dropout, the other contacts of each relay R1 and R3 are timed pull-in, that is, close a predetermined short interval after the coil is energized. The relay R2 has a pair of back contacts R2a and R2b and a front contact R2c. The relay MF has a pair of front contacts MFa and MFb, and the relay MR has a pair of front contacts MRa and MRb. The relays R1 and R3 are of the type which become actuated immediately on being energized but drop out a predetermined time interval after their respective coils are deenergized.

The coil of relay R1 is adapted to be connected between conductors DL1 and DL2 through the switch SWF and to be locked in through front contact R1a and back contact R2a. The coil of relay R3 is adapted to be connected between conductors DL1 and DL2 through switch SWR and to be locked in through R3a and R2b. The coil of relay R2 is adapted to be connected between conductors DL1 and DL2 through a contact Aa which is closed when Amplifier IV is supplied with a signal from the Record. The coil of relay R2 is adapted to be locked in between conductors DL1 and DL2 through back contacts R1c and R3c and front contact R2c. The coil of relay MF is adapted to be connected between conductors DL1 and DL2 through front contact R1b. The coil of relay MR is adapted to be connected between conductors DL1 and DL2 through front contact R3b.

The motor MO1 is adapted to be connected between conductors DL3 and DL4 through speed reducing resistors 51 and front contacts MFa and MFb. When contacts MFa and MFb are closed, the motor MO1 is rotated so as to advance the Record in a forward direction at the speed in which a sound may be reproduced from the Record. The motor MO1 is also adapted to be connected between conductors DL3 and DL4 through front contacts MRa and MRb. When these contacts are closed the motor is rotated in a reverse direction at a higher speed than that which serves for reproducing the Record.

The output of Head III is connected to the input of Amplifier III. The output of this Amplifier is connected to a loop 61 which extends around the board. This loop conducts current pulses corresponding to the pickup of the Head III. The output of Head IV is connected to the input of Amplifier IV. The output of Amplifier IV controls the Control Unit through contact Aa.

The apparatus shown in FIGS. 5 through 7 also includes a Counter and a Direction Discriminator. The count setting of the Counter should be readily visible to the operator. The Direction Discriminator is controlled from the Control Unit and is set in accordance with the direction of advance of the Record. The Direction Discriminator is connected to the Counter and conditions the Counter in accordance with the setting of the Direction Discriminator. The Counter is also connected to Amplifier IV and is controlled in accordance with the response of this Amplifier. On the movement of the Record in a forward direction, the Direction Discriminator conditions the Counter for counting in the forward sense. At each response of Amplifier IV, it causes the Counter to count one in the forward direction. If the Record is moved in the reverse direction, the Direction Discriminator conditions the Counter to count in the reverse sense and one count in the reverse sense is produced for each response of Amplifier IV.

The apparatus shown in FIGS. 5 through 7 also includes a rotatable bin 71 which is rotatable by a motor MO2. This bin carries a plurality of cables or wires 73 prearranged in such a position that a cable of a suitable length to be used for each step is available to the operator in the order in which the steps are to be carried out.

The motor MO2 is controlled from an External Control Unit which is actuable by Amplifier IV to cause the motor to rotate when this Amplifier responds. The External Control Unit is also controlled from the Direction Discriminator and conditioned by the latter so that the bin rotates in a direction corresponding to the direction of the Record.

The apparatus shown in FIGS. 5 through 7 also includes a receiver 81 similar to the receiver of a hearing-aid. This receiver 81 preferably is of the transistorized, induction type including a pickup coil 83 and an ear piece 88. The complete unit may be readily suspended from the operator's ear.

Operation-recording

The messages for carrying out an industrial operation such as the assembly of a cable harness are recorded usually by an information writer from the schematic and the circuit diagram. The writer threads a Record into the Record Transport of the recording apparatus (FIG. 4) for example a tape into a magnetic tape recorder, and sets the Heads I and II in the proper positions in the recording gate of the Transport. The writer, then, sets the Speed Control Unit for normal-speed-forward and the Recorder-Monitor Unit to record. He, then, closes the switch SWR1 and with the schematic and the circuit diagram before him describes the first instruction into the microphone. For example, this instruction may be simply 2–B3 to 7–N2. This means that the third pin in square 2B (FIG. 5) is to be connected to the second pin in square 7N by a conductor. The Record is advanced at normal speed and the message impressed on the record by the Head I.

When the message is completed the writer releases switch SWR1 and closes switch SWE. The release of switch SWR1 disables the Transport and the closing of the switch SWE enables the Signal Generator and the Timer and the Transport so that a tone signal of predetermined duration indicating the end of the first message is impressed through the Head II. With the Speed Control Unit set for normal forward, the Direction Discriminator conditions the Counter to count forward and when the Signal Generator is enabled the Counter counts 1.

After the signal tone is impressed on the Record, the writer releases switch SWE stopping the Record Transport. He, then, determines from the schematic and the circuit diagram the second message, closes switch SWR1 and speaks the second message into the microphone 11. The second message is, then, recorded by Head I and after the second message and stop signal have been recorded the Counter counts 2. The writer may now continue until has has completed describing the sequence of operational steps to be performed. If the writer desires to check one of the messages, he sets the Speed Control Unit to high-speed-reverse and closes switch SWR1. This actuates the Record Transport to move the Record in the reverse direction at the higher speed. While the Record is moving in the reverse direction the Head II picks up the signal and transmits an indication to the Counter. The Direction Discriminator is now set by the Speed Control Unit to condition the Counter to count in the reverse direction. The Counter, then, counts one count for each signal from Amplifier II as the Record is being wound in the reverse direction. When the Counter indicates that the message which the writer desires to review is in position to be reproduced, the writer resets the Speed Control Unit to normal-forward and sets the Record-Monitor Unit to monitor. He, then, closes pushbutton SWR1 and the message impressed is played back through the loudspeaker.

The apparatus may also include the conventional erasing apparatus with which magnetic-tape recorders are provided. Under the proper circumstances a message which is an error may be erased and rerecorded. Once a record is produced, it is usually desirable to reproduce one or more copies of this record. Such copies may be used for future reference or may be sent for rerecording or use elsewhere in the United States or abroad to people who may be interested in carrying out the industrial operation in question.

Assembly operation

In using the apparatus shown in FIGS. 5 through 7 the operator stands before the board 21 with the earphone 88 inserted in one of his ears or mounted on one of his ears and the small receiver 81 suspended from the earphone. The operator may, then, thread the proper Record into the Transport RT1 energizing the apparatus.

The operator next removes the first conductor 73 from the bin 71 and steps on the tube 41 corresponding to switch SWF. This energizes relay R1 which is locked in through front contact R1a and back R2a. The Record is now advanced reproducing the first message. The electrical impulses corresponding to this method are delivered by the output of the Amplifier III to the loop 61 and picked up by the receiver 81. The operator hears the message, for example, "2–B3 to 7–N2" and carries out the operation.

As the Record moves, the Head IV picks up the signal between messages. This signal causes a pulse to be supplied by Amplifier IV closing the contact Aa controlled by this Amplifier and energizing relay R2. The actuation of relay R2 causes front contact R2a to open deenergizing R1 after a short time interval. With R1 deenergized the advance of the Record stops. This interrupts the signal which actuates the contact of Amplifier IV, but the relay R2 remains locked in through back contact R1c which remains closed. The signal derived from Amplifier IV also enables the External Control Unit which causes the motor MO2 to rotate the bin to the second position so that the cable for the second operation is available to the operator. Amplifier IV also causes the Counter to count 1 and the operator can determine from the Counter that the first step has been completed.

The operator now again momentarily steps on the tube 41 controlling SWF again energizing relay R1 which remains energized for a short time interval after the operator releases the tube. The interval is sufficiently long so that the Record moves from the position in which the signal is being reproduced to the position in which the second message is ready for reproduction. The actuation of relay R1 opens contact R1c which deenergizes relay R2 permitting R1 again to be locked in through front contact R1a and back contact R2a. The second message is now reproduced.

The step corresponding to the second message is carried out in the same way as the step corresponding to the first message. The operator now continues until the cable harness is completed.

When the operator does not fully understand a message or is not sure that he heard the message correctly, he can have this message replayed. For this purpose, the operator presses the tube 43 connected to switch SWR. This energizes relay R3 which is locked in through back contact R2b and front contact R3a. The motor MO1 is, then, energized to reverse the Record. The reversal continues until Amplifier IV picks up the signal between the just-reproduced message and the preceding message. This causes R2 to be energized stopping the reversing of the record. In addition, the signal from Amplifier IV reverses the Count of the Counter to correspond to the setting of the Record and the bin 71. The operator may now actuate switch SWF and play back the message again. When the operator desires to play back any of the earlier messages, he presses the tube 43 corresponding to switch SWR a number of times until the Counter shows that the message to be played back is in a position to be played back. Switch SWF, is, then, actuated to play back the message.

Conclusion

The apparatus and methods disclosed above serve to carry out an industrial operation by instructing the operator audibly. It has been found that complex industrial operations may be carried out with this apparatus and practicing these methods at a very substantial saving in cost. The cost of producing the records is substantially smaller than the cost of producing corresponding printed or typewritten information. The time consumed and the cost of operating with the audibly-received messages is substantially smaller than the cost of operating under printed or typewritten instructions and the errors are reduced to a minimum.

While preferred embodiments have been disclosed herein, many modifications thereof are feasible. The invention, then, is not to be restricted except insofar as is necessitated by the spirit of the prior art.

I claim as my invention:

1. Apparatus for audibly instructing an operator to carry out an industrial operation at a work position and involving a succession of coordinated steps comprising a sound record having successive coordinated messages to instruct said operator thereon, each message corresponding to one of said steps and describing said one step and each message being separated from the preceding and succeeding messages, reproducing means to be connected to said record for reproducing said record, said reproducing means including record advancing means; and control means connected to said reproducing means and operable to permit reproductions of said messages in succession and selection of any one of said messages, said control means including first manual switch means accessible to said operator at said work position, second manual switch means accessible to said operator at said work position, first circuit means including said first switch means and said advancing means and responsive to each actuation of said first switch means to cause a message on said record set for reproduction to be reproduced and thereafter automatically to stop said record at a setting for the reproduction of the succeeding message, and second circuit means including said second switch means and said advancing means and responsive to each actuation of said second switch means for causing said record to advance from said set message to the just-preceding message and for stopping said record automatically at a setting at which said just-preceding message is set for reproduction.

2. A sound reproducer for reproducing a record having a succession of recordings thereon each recording extending over a short portion of said record and each recording being separated from the just-preceding and just-succeeding recordings by a signal impression, the said sound reproducer including first means to be connected to said record for advancing said record in a forward direction, second means to be connected to said record for advancing said record in a reverse direction, first switch means connected to said first advancing means for actuating said first advancing means to advance said record in said forward direction on each operation of said first switch means, second switch means connected to said second advancing means for actuating said second advancing means to advance said record in said reverse direction on each operation of said second switch means, first record pick-up means connected to said first advancing means responsive to a recording subjected to said pick-up means for reproducing as sound said recording while said record is advanced in said forward direction by said first advancing means, and second record pick-up means responsive to said signal impression and connected to said first and second advancing means for stopping the advance of said record following each said recording.

3. Sound recording apparatus including a sound record for recording a succession of messages on said record, each message to extend over a short portion of said record, said apparatus comprising first means to be connected to said record for advancing said record in a first direction, second means to be connected to said record for advancing said record in a second direction, first switch means connected to said first advancing means for actuating said first advancing means to advance said record in said first direction, second switch means connected to said second advancing means for actuating said second advancing means to advance said record in said second direction, sound record impressing means disposed in recording relationship with said record so that when said record is advancing in said first direction a record of sound is recorded on said record over each said short portion of said record, third switch means, signaling means, signal impressing means connected to said third switch means and to said signaling means and disposed in recording relationship with said record to record a signal produced by said signaling means on said record between said short portions on actuation of said third switch means, counting means, direction discriminating means connected to said counting means and to said first advancing means for conditioning said counting means to count on said actuation of said first advancing means, and means connected to said signaling means and to said counting means for producing a count of said counting means while said counting means is so conditioned on each actuation of said signaling means.

4. Apparatus for audibly instructing an operator to carry out an industrial operation with operational means at a work position, said operation consisting of a succession of coordinated steps carried out with said operational means, said apparatus comprising means at said position for setting said apparatus for each step of said succession, a sound record having coordinated recordings of successive messages thereon, each message corresponding to one of said steps and describing said one step and the recording of each message being separated from the just-preceding and just-succeeding recordings by a recording of a signal impression, reproducing means to be connected to said record and including record pick-up means and means for advancing said record past said pick-up means for reproducing each said message as sound, first control means connected to said advancing means and responsive to the pick-up of said signal impression recording by said pick-up means following the reproduction of a message picked up by said pick-up means for stopping said advancing means, and second control means connected to said setting means and responsive to said pick-up of said signal impression recording for setting said operational means for the step corresponding to the message just-succeeding said last-named message.

5. Apparatus for audibly instructing an operator to carry out an industrial operation with operational means at a work position, said operation consisting of a succession of coordinated steps carried out with said operational means, the said apparatus comprising means for setting said apparatus for each step of said succession, a sound record having coordinated recordings of successive messages thereon, each message corresponding to one of said steps and describing said one step and the recording of each message being separated from the recordings of the just-preceding and just-succeeding messages by a recording of a signal impression, reproducing means to be connected to said record and including record pick-up means and means for advancing said record past said pick-up means for reproducing each said message as sound, selectively actuable switch means at said work position operable by said operator and connected to said advancing means for setting said advancing means to advance said record either in a forward or a reverse direction, first control means connected to said advancing means and responsive to the pick-up of said signal-impression recording by said pick-up means following the passage of a message past said pick-up means in either direction for stopping said advancing means following said passage, and second control means connected to said setting means and responsive to the pick-up of said last-named signal impression recording for setting said operational means for the step corresponding to the message reproducible by the next advance of said record in a forward direction, said second control means including directional discriminating means connected to said record and operable to operate said setting means in accordance with the direction of advance of said record.

6. Apparatus for audibly instructing an operator to carry out an industrial operation at a work position of extended dimensions and involving a succession of coordinated steps comprising a sound record having successive coordinated messages to instruct said operator thereon, each message corresponding to one of said steps and describing said one step and each message being separated from the preceding and succeeding messages, reproducing means to be connected to said record for reproducing said record, said reproducing means including record advancing means; and control means connected to said reproducing means and operable to permit reproductions of said messages in succession and selection of any one of said messages, said control means including first manual switch means accessible to said operator throughout said extended dimensions of said work position, second manual switch means accessible to said operator throughout said extended dimensions of said work position, first circuit means including said first switch means and said advancing means and responsive to each actuation of said first switch means to cause a message on said record set for reproduction to be reproduced as sound and thereafter automatically to stop said record at a setting for the reproduction of the succeeding message, and second circuit means including said second switch means and said advancing means and responsive to each actuation of said second switch means for causing said record to advance from said set message to the just-preceding message and for stopping said record automatically at a setting at which said just-preceding message is set for reproduction as sound.

7. Apparatus for audibly instructing an operator to carry out an industrial operation involving a succession of coordinated steps at a work position, the said apparatus comprising a sound record having successive coordinated messages to instruct said operator thereon, each message corresponding to one of said steps and describing said one step and each message being separated from the preceding and succeeding messages, reproducing means to be connected to said record for reproducing said record, said reproducing means including record advancing means; and control means connected to said reproducing means and operable to permit reproductions of said messages in succession, said control means including first manual switch means accessible to said operator at said work position, second manual switch means accessible to said operator at said work position, first circuit means including said first switch means and said advancing means and responsive to each actuation of said first switch means to cause a message on said record set for reproduction to be reproduced and thereafter automatically to stop said record at a setting for the reproduction of the succeeding message, second circuit means including said second switch means and said advancing means and responsive to each actuation of said second switch means for causing said record to advance from said set message to the just-preceding message and for stopping said record automatically at a setting at which said just-preceding message is set for reproduction, and counting means responsive to each actuation of said first switch means to count the separate messages as a whole in a forward sense and responsive to each actuation of said second switch means to count the separate messages as a whole in a reverse sense so that said counting means identifies each said message by a distinguishable count.

8. Apparatus for audibly instructing an operator to carry out an operation involving a succession of coordinated steps, the said apparatus comprising a sound record having successive coordinated messages to instruct said operator thereon, each message corresponding to one of said steps and describing said one step and each message being separated from the preceding and succeeding messages, reproducing means to be connected to said record for reproducing said record, said reproducing means including record advancing means, first control means connected to said reproducing means actuable to cause a message on said record set for reproduction to be reproduced and thereafter automatically to stop said record at a setting for reproduction of the succeeding record, second control means connected to said reproducing means actuable to cause said record to advance from said set message to the just-preceding message and for stopping said record automatically at a setting at which said just-preceding message is set for reproduction, and counting means responsive to each actuation of said first control means to count each separate message as a whole in a forward sense and responsive to each actuation of said second control means to count each separate message as a whole in a reverse sense identifying each said message by a distinguishable count.

9. Apparatus for use with recording-reproducing systems, comprising, in combination, an operating station including sound transducing means and control switches, a recording machine having translating head means cooperable with a relatively movable record, transmission means interconnecting said operating station and said recording machine, said transmission circuit means being arranged to establish a circuit to permit the recording of a sequential series of message blocks on said record, circuit means operable by one of said control switches at said operating station for producing a predetermined change in signal on said record at the end of said message blocks, drive means at said recording machine and operable by another of said control switches for producing relative movement between said translating head means and said record, and counter means at said recording machine selectively responsive to said predetermined change in signal on said record for automatically indicating the number of message blocks that have passed by said translating head means.

10. Apparatus for providing audible operation instructions, comprising, in combination, an operating station including a listening device and a plurality of control devices, a reproducing machine having translating head means cooperable with a relatively movable record, said record having recorded thereon a sequential series of instructional message blocks each separated lengthwise on said record by a small space, said record further having recorded thereon a sequential series of tabulator signals each marking the end of respective message blocks, signal transmission means interconnecting said operating station and said reproducing machine, drive means at said reproducing machine for producing forward and reverse relative movement between said translating head means and said record, said drive means being conditioned for forward or reverse drive by corresponding ones of said control devices, means responsive to said tabulator signals for automatically stopping the operation of said drive means with said translating head means positioned beyond the corresponding message block, and means automatically operable when said drive means is actuated in a forward or reverse direction and arranged to prevent the stopping of said drive means for a period of time sufficient to assure that said translating head means enters the next message block.

11. Apparatus for use with a reproducing system, comprising, in combination, operating means including a sound transducer for producing audible tone signals in accordance with electrical signals fed thereto, said operating means also including control means, a reproducing machine coupled to said operating means and having translating head means cooperable with a relatively movable record, said record having recorded thereon a sequential series of message blocks and a series of changes in signal of predetermined character, said changes in signal being located on said record in positions corresponding to respective message blocks, drive means as said reproducing machine and operable by said control switch means for producing relative movement between said translating means and said record, circuit means coupling said translating head means to said transducer means to permit the recorded message blocks to be played back, sensing means at said reproducing machine selectively responsive to said predetermined change in signal on said record for automatically controlling the operation of said drive means, and counter means operable in response to said sensing means for indicating the number of the message block that is currently in position adjacent the translating head means.

12. Reproducing apparatus adapted for use in selectively playing back dictated material on a record, and wherein said record carries a series of sequential messages the ends of which are characterized by corresponding distinctive changes-in-signal; said apparatus comprising: a reproducing machine including a pick-up head cooperable with said record; drive means for producing both forward and backspacing movement between said pick-up head and said record; drive start means for controlling said drive means to produce movement between said record and said pick-up head; drive stop means coupled to said pick-up head and operable by any one of said changes-in-signal on said record to stop the relative movement between said record and said pick-up head when an end of one of said messages has been reached; and disabling means operable by said drive start means to deactivate said drive stop means for a short period of time after said drive start means has been actuated, whereby to assure that said drive means remains energized until said pick-up head no longer responds to said change-in-signal.

References Cited by the Examiner
UNITED STATES PATENTS

| | | | |
|---|---|---|---|
| 2,501,048 | 3/1950 | Haller | 179—100.1 |
| 2,514,578 | 7/1950 | Heller | 179—100.2 |
| 2,530,076 | 11/1950 | Peterson | 179—6.1 |
| 2,552,788 | 5/1951 | Hoover | 179—100.1 |
| 2,558,853 | 7/1951 | Kappeler | 179—100.2 |
| 2,561,602 | 7/1951 | Valentino | 179—100.2 |
| 2,703,714 | 3/1955 | Demby | 179—100.2 |
| 2,782,398 | 2/1957 | West | 179—100.2 |
| 2,819,940 | 1/1958 | Sorrells | 179—100.2 |
| 2,851,537 | 9/1958 | Rosenberg | 179—82 |
| 2,965,720 | 12/1960 | Bumstead | 179—100.1 |

BERNARD KONICK, *Primary Examiner.*

NEWTON N. LOVEWELL, IRVING SRAGOW, STEPHEN W. CAPELLI, *Examiners.*

L. M. ANDRUS, J. R. GOUDEAU, T. B. HABECKER, P. ROTH, *Assistant Examiners.*